United States Patent Office 3,259,609
Patented July 5, 1966

3,259,609
PREPARATION OF POWDERED RESINS
Shozo Satake, Shinjuku-ku, Tokyo, and Kenji Tatebayashi, Hodogaya-ku, Yokohama, Japan, assignors to The Furukawa Chemical Industries Company, Limited, a company of Japan
No Drawing. Filed Aug. 8, 1961, Ser. No. 129,996
Claims priority, application Japan, Sept. 13, 1960, 35/38,318
8 Claims. (Cl. 260—88.2)

This invention relates to a process for pulverizing natural or synthetic resins, and particularly to the preparation of polyolefin resins such as polyethylene and copolymers of ethylene in finely divided form.

Mechanical pulverization of natural or synthetic macromolecular polymers into fine powders has heretofore been practiced. However, while the pulverization has been comparatively easy with some polymers, it has been difficult with other materials such as soft elastic resins and those having low softening temperatures, because they soften or become viscous as their temperature rises with the heat evolved in the mechanical grinding or pulverizing treatment. In the case of polyethylene, high and intermediate-density polyethylenes, as well as low-density polyethylenes have been difficult to pulverize mechanically, since they have low brittle temperatures and comparatively low softening temperatures. Similar difficulties are encountered with other polyolefin resins, especially copolymers of ethylene and lower olefinic monomers, such as ethylene-propylene and ethylene-butene-1 copolymers.

Mechanical pulverization of resins at such low temperatures as will keep them hard and friable has also been known for long. United States Patent 2,858,299 of G. Guzzetta describes a thermomechanical process in which the resin to be pulverized is forced between two rolls at temperatures of from 70° to 105° C. to form soft friable masses, which are then pulverized into a fine powder. Another process, described in United States Patent 2,582,327 of Walter A. Haine, comprises mechanically dispersing a non-solvent throughout the resin to be pulverized, by means of a Banbury mixer, at a temperature in the neighborhood of 110° C., and subsequently cooling and mechanically pulverizing the worked resin.

An alternative method for the preparation of fine powders of polyolefin resins comprises dissolving such a resin in an organic solvent, adding to the resultant solution an organic non-solvent compatible with the said solvent in order to precipitate the polymer as a fine powder, and subsequently removing from the precipitate, the mixture of solvent and non-solvent. This disadvantage of this process is that very large quantities of solvents are necessary and removal of traces of solvent from the final product is difficult. It is also known (British patent specification 733,987, published July 20, 1955) to swell polyethylene by means of solvents which do not appreciably dissolve the resin at ordinary temperature and then to grind the swollen resin. This method also has the disadvantage that traces of solvent which are tightly held by the polymer powder are difficult to remove from the desired product.

It has now been discovered that fine powders of natural or synthetic macromolecular polymers can be prepared by blowing steam at atmospheric or subatmospheric pressure into such a polymer which has been swollen with an organic solvent so that the solvent is evaporated and displaced by water and subsequently mechanically crushing the resultant porous polymer containing water at a temperature below its softening point into a fine powder. This process produces in a short time a fine powder which all passes through a 200-mesh-per-square centimeter screen.

The process of the present invention is applicable to the preparation of fine powders of a variety of resins, including polystyrene, polyvinyl chloride, and the like, and is particularly useful for the preparation of finely divided powders of normally solid polymers of 1-olefins (having up to 8 carbon atoms in the molecule), such as polyethylene, polypropylene and copolymers of ethylene with other monomeric materials, especially lower olefins such as propylene, butene-1, and the like.

Such polymers can be made by any of several processes now known to the art. They can be prepared, for example, by polymerizing 1-olefins including ethylene and/or propylene under relatively mild conditions of temperature and pressure in the presence of a catalyst comprising a mixture of a compound of a metal of Groups IV–B, V–B, or VI–B of the Periodic Table illustrated on pages 58 and 59 of Lange's "Handbook of Chemistry, 6th edition, in combination with an organometallic compound of an alkali metal, alkaline earth metal, zinc, earth metal (especially aluminum), or rare earth metal. The compound of a Group IV–VI–B metal may be any inorganic salt or organic salt or complex of titanium, zirconium, hafnium, vanadium, columbium, tantalum, chromium, molybdenum, tungsten, thorium, or uranium. Exemplary of such compounds are titanium and zirconium tetrachlorides, tetrabutyl titanate, zirconium acetylacetone, vanadium oxyacetylacetonate, chromium acetylacetonate, etc. The organometallic compound that is used in combination with the transition metal compound may be any organo compound of an alkali metal, alkaline earth metal, zinc, earth metal, or rare earth metal as, for example, alkali metal alkyls or aryls such as butyllithium, amylsodium, phenylsodium, etc., dimethylmagnesium, diethylmagnesium, diethyl zinc, butylmagnesium chloride, phenylmagnesium bromide, alkyl- or aryl-aluminum compounds as, for example, triethylaluminum, tripropylaluminum, triisobutylaluminum, trioctylaluminum, dimethylaluminum chloride, diethylaluminum chloride, ethylaluminum dichloride, the equimolar mixture of the latter two known as aluminum sesquichloride, diisobutylaluminum chloride or fluoride, diethylaluminum hydride, ethylaluminum dihydride, diisobutylaluminum hydride, triphenylaluminum, diphenylaluminum, chloride, etc., and complexes of such organometallic compounds as, for example, sodium aluminum tetraethyl, lithium aluminum tetraoctyl, etc. The polymerization is usually carried out by mixing the two catalyst components in a diluent such as a hydrocarbon solvent and then passing the olefin to be polymerized into the catalyst mixture at atmospheric or slightly elevated pressure and at room temperature or moderately elevated temperatures.

Alternatively, the polymers processed in the invention can be prepared, for example, by the method described in U.S. Patent 2,825,721, which method is characterized by contacting ingredients including ethylene or a mixture of ethylene and propylene under polymerizing conditions with a catalyst containing, as the essential ingredients, an oxide of chromium associated with an oxide of silicon, aluminum, zirconium or thorium.

Still further, such polymers and copolymers can be prepared, for example by the method described in U.S. patent specifications Nos. 2,691,647 and 2,692,257 in which the polymerization of ethylene, propylene or mixtures of ethylene and propylene is accomplished by bringing the olefinic compounds into contact with a subhexavalent molybdenum-oxygen compound combined with an active alumina, titania, or zirconia support at a temperature between about 100° C. and 300° C. and a pressure between atmospheric and 500 p.s.i.g.

The process of the present invention is also applicable to the preparation of fine powders from flakes or chips of both low and intermediate density polyethylenes, which are prepared by well-known high pressure polymerization techniques, and to the preparation of fine powders of other natural or synthetic resins, including polystyrene, polyvinyl chloride and the like.

In the treatment of resinous polymers of the aforementioned type for the purpose of obtaining finely divided resinous powders, the polymers are first contacted with organic solvents which have a swelling or solvating action on the polymer. Such treatment can be at room temperature or at moderately elevated temperature to avoid complete dissolution of the polymer, or alternatively the solvation can be effected at elevated temperature to actually bring the resin into solution. In the latter case, the solution of polymer, which preferably contains from 5-75% solid polymer, usually 10-50% is cooled to form a precipitate of a solid polymer phase containing substantial quantities of imbibed solvent or a gel-like polymer mass which retains its solid character on cooling to room temperature. Swelling agents or solvents which can be employed include aliphatic, aromatic, hydroaromatic and chlorinated hydrocarbons, either separately or in admixture with one another. The particular choice of solvent will depend to a great extent on the particular resinous material to be treated, and the temperature at which such treatment is effected. The only requirement in selection of the solvent is that it have a swelling action on the polymer, at ambient or elevated temperature, so as to provide a solvent-containing resin mixture in the solid state, which can be subjected to steam treatment for removal of imbibed solvent and formation of a porous-water containing polymer flake or granule.

The invention described herein is particularly useful in the preparation of finely divided resins from polymers which have been prepared by polymerization processes employing the solid catalyst systems hereinbefore described. In the processes, a 1-alkene monomer is first polymerized in the presence of a finely divided solid polymerization catalyst and in the presence of a substantially inert liquid hydrocarbon reaction medium (e.g., any of the reaction media set forth in U.S. 2,692,257), under conditions effective to produce the polymer as a suspension or solution in a solvent comprising the reaction medium and excess 1-alkene monomer. Precipitated polymer, swollen with inert liquid hydrocarbon reaction medium, and optionally treated to remove catalyst residues, is then separated and steam treated to remove solvent. In solution polymerization processes, the polymerization effluent passes to a low pressure flash drum wherein most of the excess monomer, together with a minor amount of reaction medium, is flashed off as vapor. The flash drum bottoms material, comprising most of the reaction medium and all of the polymer and catalyst, is treated for physical separation of the finely divided solid catalyst particles by means such as filtration or centrifugation, and the polymer-reaction medium melt then cooled to precipitate polymer, or extruded (if the polymer concentration is sufficiently high) to form solid strands of polymer-solvent gel which are then chopped, flakes or pelleted to facilitate further processing. The solvent-rich polymer, either in the form of filter cake or chopped or pelleted extrudate is then subjected to steam stripping at atmospheric or reduced pressure to remove residual hydrocarbon reaction medium. Steam stripping of the solvent from the polymer at reduced pressure may be practiced in order to maintain the temperature in the stripping zone sufficiently low to avoid fusion of the polymer particles, particularly in cases where the polymer has a softening point below 100° C. The resultant porous polymer substantially free of hydrocarbon, contains up to about 25% water which replaces the hydrocarbon solvent, and is in a form suitable for crushing to a fine powder.

The solvent-swollen polymer which has been steam stripped to remove solvent is found to have a bulk density in the range of 0.25 to about 0.50, and preferably has a bulk density of 0.3 to 0.4. The porous polymer chips containing water may be employed in the subsequent grinding operation, or may first be dried to remove a portion of the imbibed water from the steam stripping operation. We have found that best results are obtained when the polymer chips contain at least about 1% by weight of water, and preferably up to about 15 weight percent. The quantity of water employed depends upon the kind and properties of the resin in question, the water performing the function of lubricant in the early stage of the grinding operation to facilitate crushing and pulverization, and in the later stages, to remove a sufficient amount of the heat evolved to avoid overheating and recoagulation of the resin powder.

The water-containing porous resin is pulverized or crushed in any conventional grinding or pulverizing equipment, for example by means of a universal pulverizer or equivalent industrial pulverizing machine. Pulverization is effected at ambient temperature, the water in the resin preventing undesirable overheating during the crushing operation. If desired, additional water may be added during the crushing operation to maintain the temperature in the pulverizer below the softening temperature of the resin being treated. Addition of an excessive quantity of water has no adverse effect on the particle size of the resultant powder of the synthetic resin, but will interfere with the efficiency of the operation and may result in an undesirably wet powder which will require additional drying treatment after pulverization is complete. The porous polymer chips which are obtained after steam stripping of imbibed solvent can be dried and pulverized in the presence of other non-solvent cooling liquid, for example, ethyl alcohol, propanol, isopropyl alcohol, butanol, acetone, methylethyl ketone and the like, in an amount sufficient to prevent overheating of the resin during the crushing operation.

By the method of the present invention, polyethylene of high intermediate and low density, that is, polyethylenes having densities in the range 0.915 to about 0.965 have been readily pulverized to powders having a particle size of less than 100 mesh, and powders as fine as 200 mesh are easily prepared by the disclosed technique. It may, in some instances, be desirable to pulverize the resin, classify the resultant powder as to particle size and further grind the coarser particles (e.g. 50-150 mesh) to obtain complete conversion of the coarse resin to a desirable small particle size.

Similarly, polymers of propylene, copolymers of ethylene and propylene, polystyrene and polyvinyl chloride prepared by polymerization in the presence of known catalysts which give normally solid resins have been finely pulverized by our process.

Examples are given below of the practice of the process of the present invention. In each of Examples 1-6, the resinous polymer was prepared by solution polymerization in odorless, mineral spirits of the monomer(s) in the presence of a solid catalyst, followed by removal of solid catalyst and of sufficient hydrocarbon solvent to give a solid resin-hydrocarbon solvent melt containing about 25% residual organic solvent. This melt on cooling was chopped into flakes and the flakes subjected to steam distillation for removal of the residual solvent. The steam-stripped porous flakes containing imbibed water were used directly, or as indicated, dried under vacuum at temperatures below the softening point of the resin to determine the effect of grinding the dried resin.

*Example 1*

Chips of polyethylene having 0.96 density, 3.5 melt index, and 0.45 bulk specific gravity and containing 19.0% water (sample A) and 1.5% water (sample B) were triturated by a universal pulverizer operating at 4500 r.p.m. and powders with the following particle size distributions were obtained:

|  | A, percent | B, percent |
|---|---|---|
| Below 60 mesh | 12 | 55.5 |
| 60–80 mesh | 33 | 22 |
| 80–150 mesh | 53 | 21 |
| Above 150 mesh | 2 | 1.5 |

*Example 2*

An ethylene-propylene copolymer having 0.93 density, 0.3 melt index and 0.35 bulk specific gravity and containing 19.5% water (sample A) and 0.8% water (sample B) was triturated at the same conditions as in Example 1 and powders with the following particle size distributions were obtained:

|  | A, percent | B, percent |
|---|---|---|
| Below 48 mesh | 28 | 51.0 |
| 48–80 mesh | 49 | 30.5 |
| 80–115 mesh | 20 | 17.5 |
| Above 115 mesh | 3 | 1.0 |

*Example 3*

Coarse particles of polyethylene having 0.93 density, 1.2 melt index and 0.38 bulk specific gravity and containing 19.5% water (sample A) and 0.8% water (sample B) were pulverized by a universal pulverizer operating at 3600–4000 r.p.m. and powders with the following particle size distributions were obtained:

|  | A, percent | B, percent |
|---|---|---|
| Below 100 mesh | 18 | 62.5 |
| 100–150 mesh | 36 | 32.5 |
| Above 150 mesh | 46 | 5 |

*Example 4*

In an ethylene-propylene copolymer of 0.945 density and 0.35 bulk specific gravity were incorporated 17% isopropyl alcohol (sample A) and 0.7% water (sample B) and the resin was pulverized at the same conditions as in Example 3 with the following results:

|  | A, percent | B, percent |
|---|---|---|
| Below 48 mesh | 1.0 | 6.0 |
| 48–80 mesh | 5.0 | 24.0 |
| 80–115 mesh | 11.0 | 36.0 |
| 115–150 mesh | 37.0 | 29.0 |
| Above 150 mesh | 46.0 | 5.0 |

*Example 5*

Water was added to polyethylene flakes having 0.3 g./cm.$^3$ bulk specific gravity (Izod impact strength 16.0 ft.lb./inch) in the proportion of one to one and the resin, containing 50% water, was triturated by a universal pulverizer operating at 4500 r.p.m. Ninety percent of the resultant powder passes through a 60-mesh screen.

*Example 6*

Water was added to polyethylene having 0.3 g./cm.$^3$ bulk specific gravity (Izod impact strength 1.0 ft.lb./inch) and the resin, with the respective water contents of 7.5%, 14%, 19%, and 26% was triturated at the conditions similar to those used in Example 5, with the following results:

| Percent water content | 7.5 | 14 | 19 | 26 |
|---|---|---|---|---|
| Percent powder through 84 mesh | 76 | 81 | 84 | 86 |

*Example 7*

Polyvinyl chloride flakes prepared by milling granules of polyvinyl chloride with dioxane, followed by steam stripping and drying, and having a bulk specific gravity of 0.4 g./cm.$^3$ was pulverized with 17% by weight alcohol under the conditions used in Example 5. Eighty-five percent of the resultant polymer passes through a 60-mesh screen.

*Example 8*

Water was added to polystyrene having 0.3 g./cm.$^3$ bulk specific gravity (prepared by swelling polystyrene with benzene, followed by steam stripping and drying the resin to less than one weight percent water) in the proportion of 0.2 part of water per part of polystyrene and the resin, containing 17% water, was pulverized under conditions similar to those used in Example 5. Ninety-five percent of the resultant powder passes through a 60-mesh screen.

A marked advantage of the process of the present invention is that it provides a simple method of easy pulverization of polymers which are otherwise difficult to pulverize.

We claim:

1. Process for preparing finely divided powders of normally solid polymers of vinyl olefins having from 2 to 8 carbon atoms in the molecule which comprises contacting said normally solid polymer with an inert solvent, characterized by having a solvating action on said polymer, to form a solid polymer-rich phase swollen with solvent, treating said solid polymer rich phase with steam to remove imbibed solvent and to obtain a porous polymer phase containing up to about 25% by weight of water imbibed in the pores thereof, and grinding said wet porous polymer phase at a temperature below the softening point of said resin to produce a finely divided powder of said polymer.

2. The process of claim 1 wherein the normally solid polymer is a homopolymer of ethylene.

3. The process of claim 1 wherein the normally solid polymer is a copolymer of ethylene and propylene.

4. The process of claim 1 wherein said contacting comprises dissolving the polymer in said solvent at an elevated temperature and cooling the resulting solution to form as a precipitant said polymer-rich phase.

5. The process of claim 4 wherein said precipitate is further mechanically subdivided prior to said treating.

6. The process of claim 1 wherein said porous polymer is substantially free of non-imbibed liquid during said grinding.

7. The process of claim 1 wherein said treating is conducted at sub-atmospheric pressure.

8. In a process for preparing powders of normally solid polymers of vinyl olefins having from 2 to 8 carbon atoms per molecule wherein said normally solid polymer is first swollen by contact with a solvent characterized by having a solvating action on said polymer and being chemically inert thereto, and the resulting swollen solid polymer is comminuted, the improvement of removing said swollen solid polymer from said solvent, thereafter treating said swollen solid polymer with steam to remove therefrom imbibed solvent and to obtain a porous polymer containing up to about 25 weight percent water imbibed in the pores thereof, and thereafter comminuting said porous polymer at a temperature below the softening point thereof to produce a finely divided powder.

References Cited by the Examiner

UNITED STATES PATENTS

| | | | |
|---|---|---|---|
| 2,534,079 | 12/1950 | Strain et al. | 260—17.4 |
| 2,582,327 | 1/1952 | Haine | 18—47.5 |
| 2,870,113 | 1/1959 | Jones | 260—34.2 |
| 2,957,861 | 8/1960 | Goins | 260—94.9 |

JOSEPH L. SCHOFER, *Primary Examiner.*

F. L. DENSON, *Assistant Examiner.*